US008261235B2

(12) United States Patent
Chapman

(10) Patent No.: US 8,261,235 B2
(45) Date of Patent: *Sep. 4, 2012

(54) SYSTEM FOR GENERATING A TUTORIAL APPLICATION

(75) Inventor: Gary Douglas Chapman, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1127 days.

This patent is subject to a terminal disclaimer.

(21) Appl. No.: 12/132,677

(22) Filed: Jun. 4, 2008

(65) Prior Publication Data

US 2008/0288922 A1 Nov. 20, 2008

Related U.S. Application Data

(63) Continuation of application No. 10/743,606, filed on Dec. 22, 2003, now Pat. No. 7,415,714.

(30) Foreign Application Priority Data

Feb. 21, 2003 (GB) .................................. 0303977.3

(51) Int. Cl.
*G06F 9/44* (2006.01)
*G06F 3/048* (2006.01)

(52) U.S. Cl. ........ 717/109; 717/105; 717/113; 715/781; 719/310; 719/318; 719/320

(58) Field of Classification Search .................. 717/101, 717/105, 109, 113
See application file for complete search history.

(56) References Cited

U.S. PATENT DOCUMENTS

| 5,655,130 | A | 8/1997 | Dodge et al. |
| 6,259,445 | B1 | 7/2001 | Hennum et al. |
| 6,507,855 | B1 | 1/2003 | Stern |
| 6,692,256 | B2 * | 2/2004 | Chan et al. ..................... 434/118 |
| 6,871,348 | B1 | 3/2005 | Cooper |
| 6,931,385 | B1 | 8/2005 | Halstead et al. |
| 7,415,714 | B2 * | 8/2008 | Chapman ..................... 719/320 |
| 2003/0037312 | A1 | 2/2003 | Czech |
| 2004/0199901 | A1 * | 10/2004 | Chapman ..................... 717/123 |
| 2007/0015118 | A1 * | 1/2007 | Nickell et al. ................ 434/118 |
| 2008/0288922 | A1 * | 11/2008 | Chapman ..................... 717/123 |
| 2008/0301717 | A1 * | 12/2008 | Chilimbi et al. .............. 719/329 |
| 2010/0088683 | A1 * | 4/2010 | Golender et al. ............. 717/128 |

OTHER PUBLICATIONS

Comai et al., "An e-Learning collaborative RIA environment for Web Application Modeling and Code Generation", © 2007 IEEE, retrieved from <http://ieeexplore.ieee.org/stamp/stamp.jsp?tp=&arnumber=4312972>, total pp. 5.*

* cited by examiner

*Primary Examiner* — Don Wong
*Assistant Examiner* — Marina Lee
(74) *Attorney, Agent, or Firm* — Hoffman Warnick LLC; Andrea Bauer

(57) ABSTRACT

The invention relates to the field of source code development and in particular a method and system for generating a tutorial application from one or more selected source code elements. The invention provides for a user to select one or source code elements and one or more data elements to be tagged to one or more source code elements. The selected source code elements are tagged using a mark-up language and a tutorial application is generated displaying the tagged selected source code elements and the data elements.

18 Claims, 5 Drawing Sheets

FIG. 3

```
<TUTORIAL_STEP SEQUENCE_NUMBER=1 TITLE="Initialize workManager">
    <CODE_SEGMENT>
        pw.println("Obtaining InitialContext ...<br>");
        InitialContext ic = new InitialContext();
        pw.println("Intialising workManager ...<br>");
        workManager workManager = (workManager) ic.lookup("java:comp/env/wm");
        pw.println("WorkManager Initialised: <i>" + workManager + "</i><br>");
    </CODE_SEGMENT>
    <EXPLANATION_TEXT>
        The workmanager is initialized via a JNDI lookup. WAS enterprise
        provides a pre-configured workManager called workManagerInfo1
        with a JNDI name of wm/workMgr1 (you can see it in the admin
        console under Resources - Work Manager). In this sample application,
        a Resource Reference, wm, has been created, referring to wm/workMgr1,
        and it is this reference which is used in the lookup call.
        Note: pw is a PrintWriter object which is used throughout this
        sample application to write run time
        informational messages to the Results window below.
    </EXPLANATION_TEXT>
</TUTORIAL_STEP>
```

FIG. 4

Thread Management

- 1. Initialize WorkManager
- 2. Code the Asynchronous Work
- 3. Dispatch the Asynchronous Work
- 4. Await Work Completion Run the Example Home

Code Window

```
pw.println("Obtaining InitialContext
...<br>");
InitialContext ic = new InitialContext
();
pw.println("Initialising WorkManager
...<br>");
WorkManager workManager = (WorkManager)
ic.lookup ("java:comp/env/wm");
pw.println("WorkManager Initialised:
<i>" + workManager + "</i><br>");
```

Explanation Window

Initialize WorkManager

The Workmanager is initialized via a JNDI lookup. WAS enterprise provides a pre-configured WorkManager called WorkManagerInfo1 with a JNDI name of wm/WorkMgr1 (you can see it in the admin console under Resources - Work Manager). In this sample application, a Resource Reference, wm, has been created, referring to wm/WorkMgr1, and it is this reference which is used in the lookup call.

Results Window

Beginning Processing...
Obtaining InitialContext...
Initialising WorkManager...
WorkManager Initialised: *WorkManagerImpl:DefaultWorkManager*
Dispatching the Asynchronous Work
Running MyWork constructor for thread 0
Running MyWork constructor for thread 1
Running MyWork constructor for thread 2

FIG. 5

SYSTEM FOR GENERATING A TUTORIAL APPLICATION

CROSS-REFERENCE TO RELATED APPLICATIONS

This application is a Continuation application of patent application Ser. No. 10/743,606, filed Dec. 22, 2003, entitled "Method and System for Generating a Tutorial Application," now U.S. Pat. No. 7,415,714, which is hereby incorporated herein by reference.

FIELD OF THE INVENTION

The invention relates to the field of source code development and in particular a system for generating a tutorial application from one or more source code elements.

BACKGROUND OF THE INVENTION

Technology is constantly changing at a rapid pace and it is difficult for many companies to keep up to date with the latest technological developments. In order for companies to compete with their competitors in the market place it is vital that companies keep ahead of the latest technological developments and provide education to their employees to enable the employees to develop the required skills.

Educating employees is a time consuming and expensive task. It takes a considerable amount of time on behalf of a course tutor in preparing course materials and collating the information required. In the IT industry this is particularly a problem when employees need to be able to learn a new programming language or how to apply a programming language to achieve a particular programming task. Every time a person learns a new programming language, for example, the programming language C which is a registered trade mark of AT&T Bell Laboratories, or Java which is a registered trade mark of Sun Microsystems Inc, each new programming language brings with it its own way of doing things; taking the example of the programming language C, it is important to learn how the pre-processor directives operate, i.e., commands that give instructions to the C Pre-processor whose job it is to modify the source code of a C program before it is compiled, or what libraries are available, the types of reserved words that can be used and types of standard and user-defined identifiers, variable declarations and data types.

A common approach to devising tutorials for learning programming skills has been to produce a tutorial document which references the relevant elements of the source code by line number in a text editor. The person learning the programming skills is then able to read the tutorial document in conjunction with the source code. If the student does not understand, for example, how a particular sort routine works, by referring to the line number of the source code the person can cross reference the line number to the corresponding numbered section in the tutorial document, which explains how the sort routine works.

Another approach to devising programming tutorials can be seen in web based tutorials. The web based tutorial displays a section of source code, that provides a sort routine for example. To find out how a particular element of source code works a hyperlink is provided and by clicking on the hyperlink with a mouse pointer or other input device the required information is displayed. In some examples it is possible that the hyperlink launches an application that runs the compiled code in order to observe the result, for example, how a sort routine sorts elements in an array.

All of the above examples are time consuming on behalf of the person creating the tutorial. If a web based application is being developed, the person developing the tutorial will have to have knowledge of html to create the hyperlinks and further programming knowledge to enable the tutorial to operate interactively with a student. If a more paper based approach is used, then considerable time and effort is spent writing the documentation and cross-referencing the written documentation with the line number of the source code.

Another example is CACTUS, from the University of Madrid Spain, which offers an integrated environment to design tutorial courses for interactive applications. CACTUS is specifically for generating course documentation to teach how to use a graphical user interface. The graphical user interface is described in detail using a purpose built specification language and CACTUS takes the detailed description and from this generates user documentation. A drawback with this approach is the time and effort it takes in creating an interactive application.

Therefore an improved method and system is required for automatically generating a tutorial application based on source code written to achieve a particular task.

SUMMARY OF THE INVENTION

According to an aspect of the present invention there is provided a system for generating a single tutorial application linked to one or more source code files, the system comprising: means for receiving user input indicating one or more source code elements to be selected and one or more data elements to be tagged to one or more selected source code elements; means for tagging one or more selected source code elements with one or more data elements; means for generating the single tutorial application linked to one or more source code files from said tagged source code elements; means for displaying the generated single tutorial application, the tagged source code elements, and the data elements in a display interface, wherein the display interface simultaneously displays: a list of tutorial steps contained within the generated single tutorial application; a code window containing a source code element associated with a selected one of the tutorial steps of the list of tutorial steps; and an explanation window containing the one or more data elements associated with the source code element displayed in the code window, and means for selectively running the source code element displayed in the code window, wherein the means for displaying simultaneously displays results of the running in a results window, the list of tutorial steps, the code window, and the explanation window; wherein each of the list of tutorial steps, the code window, the explanation window, and the results window are integrated as separate segments of the generated single tutorial application within a single window, and wherein the generated single tutorial application is self-contained.

According to another aspect of the present invention there is provided a computer program product directly loaded into the internal memory of a digital computer, comprising software code portions for generating a single tutorial application linked to one or more source code files when said product is run on the digital computer, the computer program product comprising software code portions for:
receiving user input indicating one or more source code elements to be selected and one or more data elements to be tagged to one or more selected source code elements; tagging one or more selected source code elements with one or more of the data elements; generating the single tutorial application linked to one or more source code files from said tagged source code elements; displaying the generated single tutorial application, the tagged source code elements, and the data elements in a display interface, wherein the display interface simultaneously displays: a list of tutorial steps contained within the generated single tutorial application; a code window containing a source code element associated with a selected one of the tutorial steps of the list of tutorial steps; and an explanation window containing the one or more data elements associated with the source code element displayed in the code window, and selectively running the source code element displayed in the code window, wherein results of the running are displayed in a results window in the display interface simultaneously with the list of tutorial steps, the code window, and the explanation window; wherein each of the list of tutorial steps, the code window, the explanation window, and the results window are integrated as separate segments of the generated single tutorial application within a single window, and wherein the generated single tutorial application is self-contained.

BRIEF DESCRIPTION OF THE DRAWINGS

The invention will now be described by way of example only, with reference to the accompanying drawings.

FIG. 3, illustrates the input interface of the tutorial generation application of FIG. 1, according to an embodiment of the present invention.

FIG. 4, illustrates an element of source code tagged with a markup language as it would be stored in the tutorial generation application of FIG. 1, according to an embodiment of the present invention.

FIG. 5, illustrates the generated tutorial application as used by a student according to an embodiment of the present invention.

DETAILED DESCRIPTION OF THE INVENTION

Figure 1:
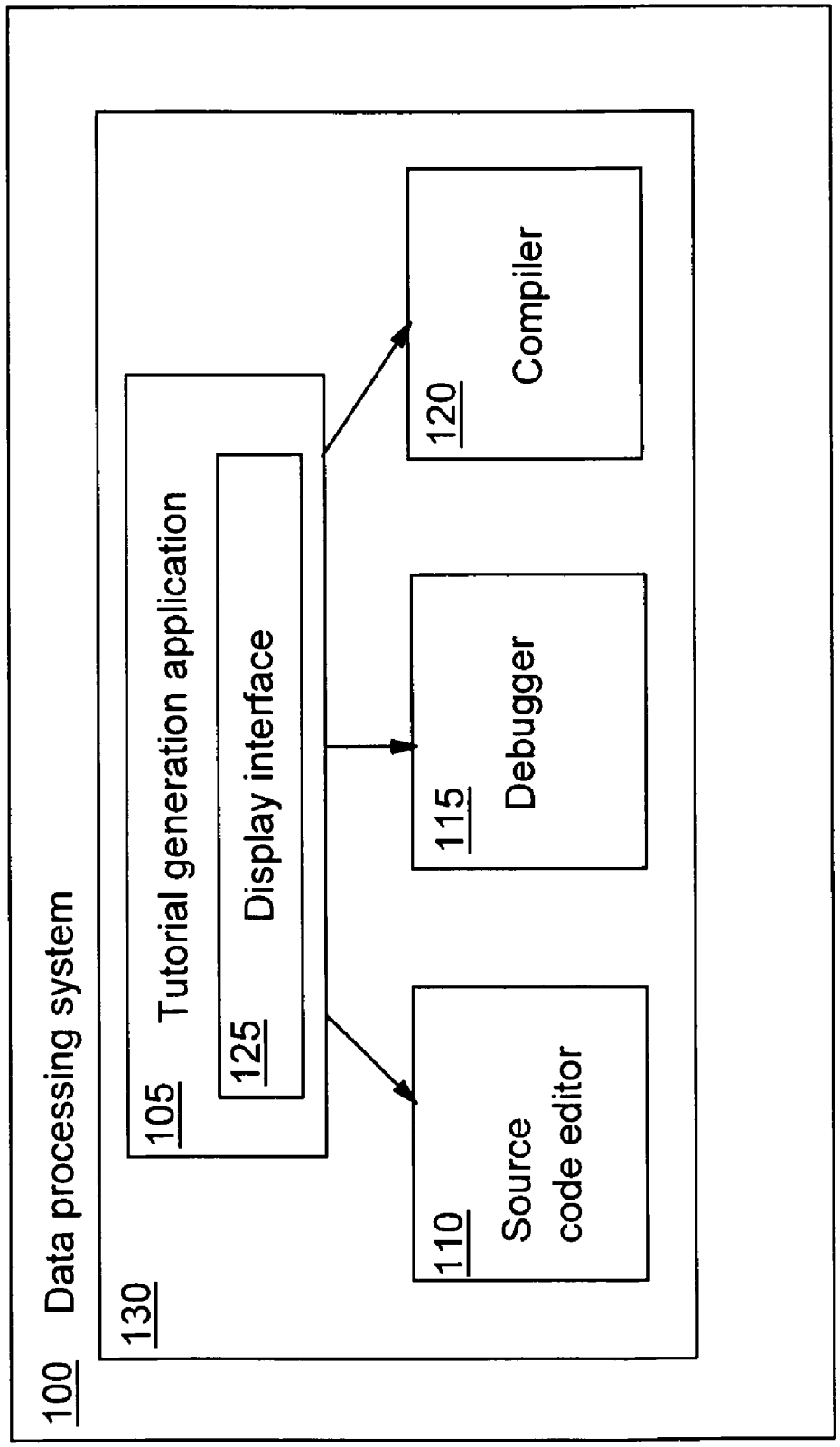
FIG. 1, illustrates the tutorial generation application as running on a data processing system, according to an embodiment of the present invention.

FIG. 1, illustrates the tutorial generation application 105 running on a data processing system 100. The tutorial generation application 105 could equally run on a server which is accessed by a client device across a network. The tutorial generation application 105 comprises a development environment 130 which further comprises a source code editor 110 for developing or editing source code, a compiler 120 for translating the source code into object code, a debugger 115 for detecting errors in the source code and a display interface 125 to display the generated tutorial application. The tutorial generation application 105 can also be provided as a 'plug in' option to a preferred programming environment. A user can either create the source code in their preferred programming environment and then invoke the plug-in in order to launch the tutorial generation application 105 or create the source code in the development environment 130 provided by the tutorial generation application 105. The tutorial generation application 105 provides support for the many different types of programming languages and for the different types of execution environments that it will be run on. These preferences can all be manually configured from a menu option within the tutorial generation application. By selecting the 'file menu' and then selecting 'new' it is possible to create a new tutorial.

The user is prompted to enter a name for the new tutorial for example 'Thread Management'.

Figure 2:
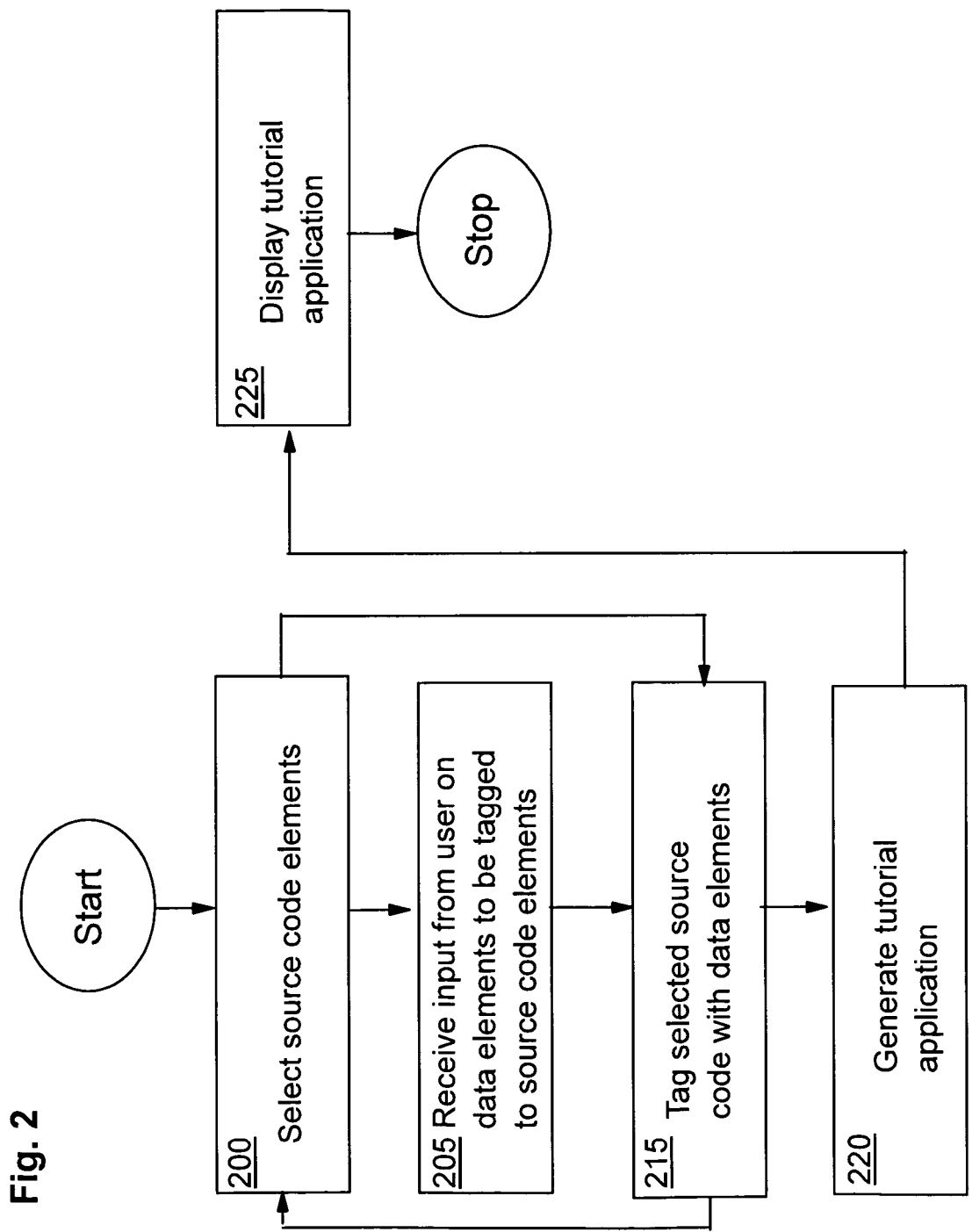
FIG. 2, illustrates the steps that the tutorial generation application of FIG. 1, carries out, according to an embodiment of the present invention.

Referring to FIG. 2 at step 200, the tutorial generation application 105 receives input from a user on the source code elements to be selected and the data elements to be tagged to the selected source code elements at step 205. Steps 200 and 205 of FIG. 2, will now be explained further, by way of an example with reference to FIG. 3.

The user can select the source code 305 in the source code editor 300 by means of an input device such as a mouse. Either by right clicking with the mouse, or by selecting an option from the tutorial generation application's 'Create' menu, or by clicking a smarticon, an input window called 'Tutorial Step' is displayed 310.

For each tutorial it is possible to have many tutorial steps. For example in the tutorial 'Thread Management' there are many steps that a programmer must write when managing threads. Each of these individual steps must be explained to a student in order for the student to understand the complexities of thread management. In such a case it is therefore necessary to select each element or group of elements of source code from one or more source code files that are required in a particular step and tag each element or group of elements with the appropriate data elements. Equally, the tutorial 'Thread Management' could be part of a larger tutorial, for example, 'Asynchronous Beans', and as such the user is able to describe and structure the tutorial in a logical hierarchical approach when creating the tutorial for the first time or by modifying an existing tutorial.

The input window 310 provides a means in which to input the data elements which will be tagged to the source code. Firstly, the tutorial step is given a title 315; in this example the title is 'Initialise WorkManager'. The tutorial step is given a sequence number 320, in this example the number given is the number 1 which dictates that this particular tutorial step is the first step in a sequence. Subsequent steps would be labeled 2, 3, 4 and so on. Lastly, the data elements that are to be tagged to the selected source code elements are entered into the input box 325. In this example the data elements that comprise the explanation text that will be generated by the tutorial generation application 105 explain how the WorkManager is initialized. When all the required information is input into the tutorial step window 310, the user can select the 'OK' button 330 to continue or equally the user can select the cancel button 335 to disregard the information input into the input boxes 315, 320 and 325 of the tutorial step window 310.

Referring back to FIG. 2, at step 215 the data elements are tagged to the selected source code. The tags are provided by a markup language such as XML. XML is a universal format for structured documents on the world wide web. XML is a set of rules for designing text formats that allow metadata to be structured using tags (words bracketed by '<' and '>') and attributes (of the form name="value") to delimit the metadata. Step 215 of FIG. 2, will now be explained further, by way of an example with reference to FIG. 4 which illustrates a selected element of source code tagged using XML as the markup language and tagged with the attributes of the input data elements as shown in FIG. 3.

Figure 3:
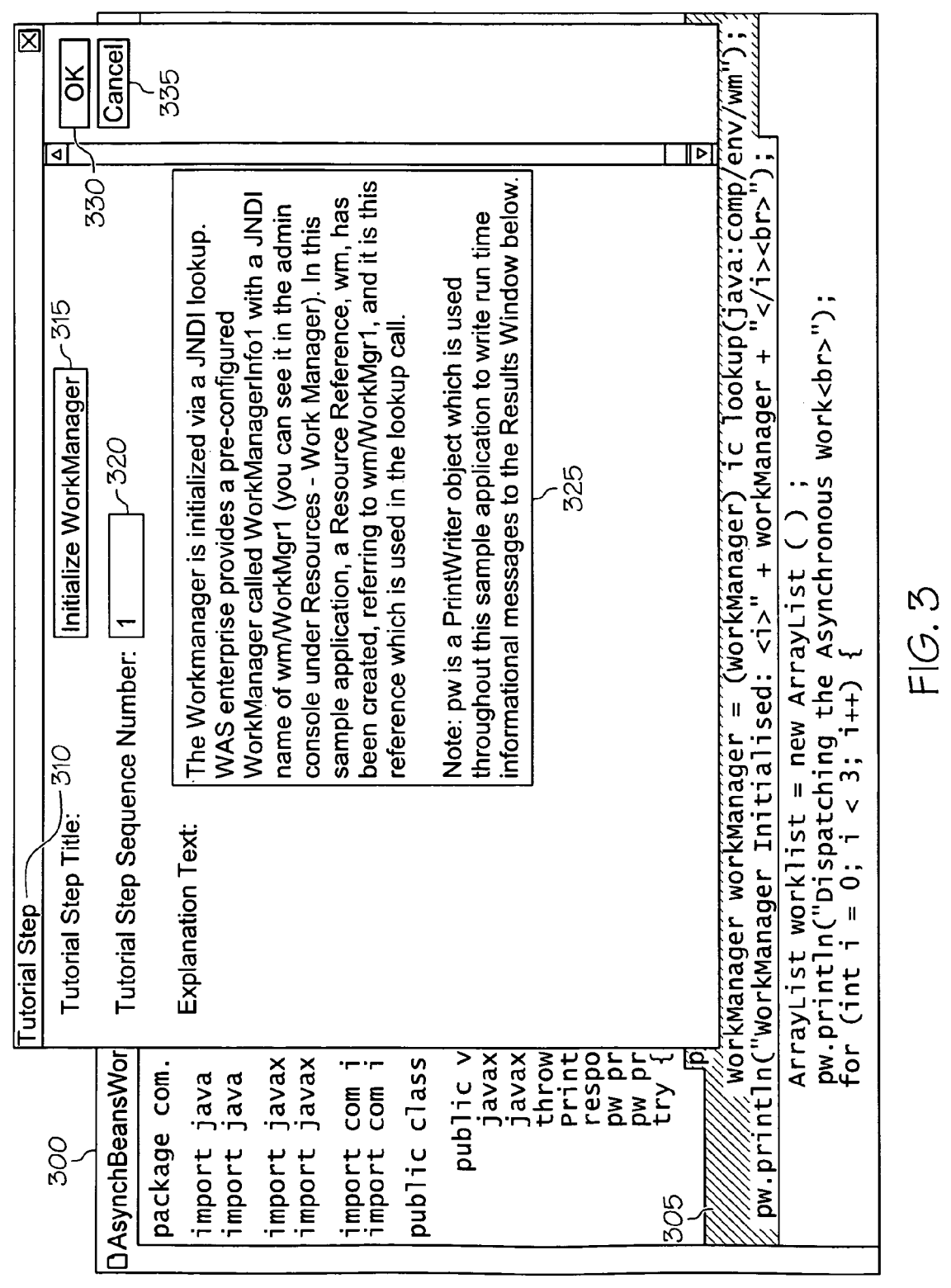

Firstly, the selected source code is tagged by the tutorial generation application 105 with a tutorial step tag 400 with attributes of the sequence number 405 in this example the sequence number is '1' which was input into the tutorial step sequence input box 320 in FIG. 3 and the title of the tutorial step 410 as input into the tutorial step title input box 315 in FIG. 3. The tutorial step tag 400 flags to the tutorial generation tool 105 precisely where the selected tutorial step begins and where it ends 435. A code segment tag 415 marks where the selected source code 305 begins and ends with the code segment close tag 420. Finally the explanation text tag 425, tags the data elements that comprise the explanation text as input into the explanation text input box 320 in FIG. 3 and flags where the data elements finish by the explanation text closing tag 430. Referring back to steps 200, 205 and 215 of FIG. 2, these steps are repeated until all the tutorial steps have been completed.

Referring back to FIG. 2 at step 220 the tutorial generation application 105 generates a tutorial application from the tagged source code in FIG. 4. The tutorial application is displayed at step 225 along with the selected source code. The display interface of step 225 of FIG. 1, will now be explained further, by way of an example with reference to FIG. 5.

FIG. 5 depicts the display interface of the tutorial generation application 105. The interface comprises a code window 510, an explanation window 530, a list of the tutorial steps 500 contained within the tutorial application, in this example the tutorial application 'Thread Management' and a results window 520. Although FIG. 5 depicts a display interface comprising the components above, it will be appreciated by a person skilled in the art that numerous configurations of the above components are possible.

The tutorial steps that were compiled in steps 200 and 205 of FIG. 1 are displayed in a list 505, which enables a student to select each element within the list 500 such that the student can select which part of the tutorial that they would like to explore. Each time the student selects a tutorial step to explore from the list 505, for example by selecting 'Initialize Work-Manager' 500, the selected source code that is titled 'Initialize WorkManager' is displayed in the code window 515. The tutorial application 'step explanation' generated from the tagged source code is displayed in the explanation window 530. The student is able to read the source code in the code window 515, whilst referring to the explanation window 530 for the explanation text. The tutorial is therefore self contained without the student needing to refer to further documentation to explain the fundamental concepts.

A results window 535 allows the student to run the tutorial application by selecting the 'run example' option from the list 505. The tagged source code is executed within the results window 535 and the executed source code is displayed corresponding to the steps selected by the student from the list 505.

The invention claimed is:

1. A system for generating a single tutorial application linked to one or more source code files, the system comprising:
 a system for receiving user input indicating one or more source code elements to be selected and one or more data elements to be tagged to one or more selected source code elements;
 a system for tagging one or more selected source code elements with one or more data elements;
 a system for generating the single tutorial application linked to one or more source code files from the tagged source code elements;
 a system for displaying the generated single tutorial application, the tagged source code elements, and the data elements in a display interface,
 wherein the display interface simultaneously displays:
  a list of tutorial steps contained within the generated single tutorial application;
  a code window containing a source code element associated with a selected one of the tutorial steps of the list of tutorial steps; and
  an explanation window containing the one or more data elements associated with the source code element displayed in the code window,
 and
 a system for selectively running the source code element displayed in the code window, wherein the system for displaying simultaneously displays results of the running in a results window, the list of tutorial steps, the code window, and the explanation window;
 wherein each of the list of tutorial steps, the code window, the explanation window, and the results window are integrated as separate segments of the generated single tutorial application within a single window, and
 wherein the generated single tutorial application is self-contained.

2. The system as claimed in claim 1, wherein the selected source code elements are tagged by a markup language.

3. The system as claimed in claim 1, wherein at least one programming language is supported.

4. The system as claimed in claim 1, wherein at least one execution environment is supported.

5. The system as claimed in claim 1, wherein the system for receiving user input further comprises a system for creating at least one tutorial step.

6. The system as claimed in claim 1, wherein the data elements further comprise explanation text for the selected source code elements.

7. A computer program product directly loaded into a non-transitory internal memory of a digital computer, comprising software code portions for generating a single tutorial application linked to one or more source code files when the product is run on the digital computer, the computer program product comprising software code portions for:
 receiving user input indicating one or more source code elements to be selected and one or more data elements to be tagged to one or more selected source code elements;
 tagging one or more selected source code elements with one or more of the data elements;
 generating the single tutorial application linked to one or more source code files from the tagged source code elements;
 displaying the generated single tutorial application, the tagged source code elements, and the data elements in a display interface,
 wherein the display interface simultaneously displays:
  a list of tutorial steps contained within the generated single tutorial application;
  a code window containing a source code element associated with a selected one of the tutorial steps of the list of tutorial steps; and
  an explanation window containing the one or more data elements associated with the source code element displayed in the code window,
 and
 selectively running the source code element displayed in the code window, wherein results of the running are displayed in a results window in the display interface simultaneously with the list of tutorial steps, the code window, and the explanation window;
 wherein each of the list of tutorial steps, the code window, the explanation window, and the results window are integrated as separate segments of the generated single tutorial application within a single window, and
 wherein the generated single tutorial application is self-contained.

8. The computer program product as claimed in claim 7, wherein the selected source code elements are tagged by a markup language.

9. The computer program product as claimed in claim 7, wherein at least one programming language is supported.

10. The computer program product as claimed in claim 7, wherein at least one execution environment is supported.

11. The computer program product as claimed in claim 7, wherein the receiving user input further comprises creating at least one tutorial step.

12. The computer program product as claimed in claim 7, wherein the data elements further comprise explanation text for the selected source code elements.

13. A computer program embodied on a non-transitory computer readable storage medium for performing a method for generating a single tutorial application linked to one or more source code files when the program is executed on a computer device, the method comprising:
receiving user input indicating one or more source code elements to be selected and one or more data elements to be tagged to one or more selected source code elements;
tagging one or more selected source code elements with one or more of the data elements;
generating the single tutorial application linked to one or more source code files from the tagged source code elements;
displaying the generated single tutorial application, the tagged source code elements, and the data elements in a display interface,
wherein the display interface simultaneously displays:
a list of tutorial steps contained within the generated single tutorial application;
a code window containing a source code element associated with a selected one of the tutorial steps of the list of tutorial steps; and
an explanation window containing the one or more data elements associated with the source code element displayed in the code window,
and
selectively running the source code element displayed in the code window, wherein results of the running are displayed in a results window in the display interface simultaneously with the list of tutorial steps, the code window, and the explanation window;
wherein each of the list of tutorial steps, the code window, the explanation window, and the results window are integrated as separate segments of the generated single tutorial application within a single window, and
wherein the generated single tutorial application is self-contained.

14. The computer program as claimed in claim 13, wherein the selected source code elements are tagged by a markup language.

15. The computer program as claimed in claim 13, wherein at least one programming language is supported.

16. The computer program as claimed in claim 13, wherein at least one execution environment is supported.

17. The computer program as claimed in claim 13, wherein the receiving user input further comprises creating at least one tutorial step.

18. The computer program as claimed in claim 13, wherein the data elements further comprise explanation text for the selected source code elements.

* * * * *